United States Patent
Tao et al.

(10) Patent No.: US 8,009,580 B2
(45) Date of Patent: *Aug. 30, 2011

(54) SIGNALING AND TRAINING FOR ANTENNA SELECTION IN OFDMA NETWORKS

(75) Inventors: Zhifeng Tao, Allston, MA (US); Andreas F. Molisch, Arlington, MA (US); Philip V. Orlik, Cambridge, MA (US); Jinyun Zhang, Cambridge, MA (US); Shigeru Uchida, Kanagawa (JP); Kentarou Sawa, Fujisawa (JP)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 668 days.

This patent is subject to a terminal disclaimer.

(21) Appl. No.: 12/117,219

(22) Filed: May 8, 2008

(65) Prior Publication Data
US 2009/0016372 A1  Jan. 15, 2009

Related U.S. Application Data (63) Continuation-in-part of application No. 11/777,356, filed on Jul. 13, 2007, now Pat. No. 7,756,099.

(60) Provisional application No. 61/035,105, filed on Mar. 10, 2008.

(51) Int. Cl.
*H04W 4/00* (2009.01)
(52) U.S. Cl. ......... 370/252; 370/329; 370/641; 370/644
(58) Field of Classification Search .................. None
See application file for complete search history.

(56) References Cited

U.S. PATENT DOCUMENTS

| | | | |
|---|---|---|---|
| 6,035,183 A | 3/2000 | Todd | |
| 7,215,653 B2 | 5/2007 | Kim et al. | |
| 7,327,983 B2* | 2/2008 | Mehta et al. | 455/63.1 |
| 7,573,851 B2 | 8/2009 | Xing et al. | |
| 7,583,939 B2* | 9/2009 | Mehta et al. | 455/91 |
| 7,657,244 B2* | 2/2010 | Niu et al. | 455/277.1 |
| 7,697,623 B2* | 4/2010 | Mehta et al. | 375/260 |
| 7,778,147 B2* | 8/2010 | Forenza et al. | 370/204 |
| 2005/0232156 A1* | 10/2005 | Kim et al. | 370/236 |
| 2007/0041464 A1* | 2/2007 | Kim et al. | 375/267 |
| 2008/0095223 A1 | 4/2008 | Tong et al. | |

FOREIGN PATENT DOCUMENTS

| | | |
|---|---|---|
| WO | 9859450 | 12/1998 |
| WO | 2005034387 | 4/2005 |
| WO | 2008023811 | 2/2008 |

* cited by examiner

*Primary Examiner* — Chi Pham
*Assistant Examiner* — Soon-Dong Hyun
(74) *Attorney, Agent, or Firm* — Dirk Brinkman; Gene Vinokur (57) ABSTRACT

A method selects antennas in an OFDMA wireless network including a base station and a mobile station. The mobile station measures a channel state of a downlink in a downlink subframe using different subsets of available antennas, and selects a subset of receive antennas for downlink reception based on the channel states between the base station and the different subsets of antennas at the mobile station. The base station measures the channel state in an uplink using an uplink subframe received in the base station from the mobile station, and selects a subset of transmit antennas for mobile station's uplink transmission based on the channel states between the base station and different subset of antennas at the mobile station.

13 Claims, 8 Drawing Sheets

SIGNALING AND TRAINING FOR ANTENNA SELECTION IN OFDMA NETWORKS

RELATED APPLICATION

This is a Continuation-in-Part patent application of U.S. patent application Ser. No. 11/777,356, "Method and System for Selecting Antennas Adaptively in OFDMS Network," file by Tao et al., on Jul. 13, 2007 now U.S. Pat. No. 7,756,099, incorporated herein by reference, and this application claims priority to U.S. Provisional Patent Application 61/035,105, "Signaling for Antenna Selection in OFDMA networks" filed Mar. 10, 2008 by Tao et al., incorporated herein by reference.

FIELD OF THE INVENTION

This invention relates generally to wireless networks, and more particularly to selecting antennas in OFDMA networks.

BACKGROUND OF THE INVENTIONS

Orthogonal Frequency-Division Multiplexing (OFDM)

OFDM uses multiple orthogonal sub-carriers to transmit information at a relatively low symbol rate. As an advantage, OFDM can withstand severe changes in channel state and quality, such as high frequency attenuation, narrowband interference, and frequency-selective fading due to multipath, using a single carrier. Channel equalization is simplified because OFDM uses slowly-modulated narrowband signals rather than one rapidly-modulated wideband signal. A low symbol rate enables guard intervals and time-spreading, while eliminating inter-symbol interference (ISI). Some of the subcarriers in some of the OFDM symbols carry pilot signals for estimating the channel state, and performing synchronization.

Orthogonal Frequency Division Multiple Access (OFDMA)

As a disadvantage, OFDM does not provide multi-user channel access to a channel OFDMA corrects this problem by time, frequency or coding separation of multiple transceivers. That is, frequency-division multiple access is achieved by assigning different OFDM sub-channels to different transceivers. A sub-channel is a group of subcarriers, which need not be physically contiguous in frequency. OFDMA is used in the uplink of the IEEE 802.16 Wireless MAN standard, commonly referred to as WiMAX.

WiMAX

The IEEE 802.16 standard defines an air interface, while WiMAX specifies both the IEEE 802.16 air interface and the networking aspect of the system. WiMAX is a broadband wireless access technology, see "IEEE Standard for Local and Metropolitan Area Networks—Part 16: Air Interface for Fixed Broadband Wireless Access Systems," IEEE Computer Society and the IEEE Microwave Theory and Techniques Society, October 2004, and "IEEE Standard for Local and Metropolitan Area Networks—Part 16: Air Interface for Fixed Broadband Wireless Access Systems, Amendment 2: Physical and Medium Access Control Layers for Combined Fixed and Mobile Operation in Licensed Bands," IEEE Computer Society and the IEEE Microwave Theory and Techniques Society, February 2006, incorporated herein by reference.

Antenna Selection

It is known that each antenna provides a different propagation path that experiences a distinct channel gain. Therefore, it is important to selectively connect a subset of the N available antennas to M RF chains, where $N \geq M$, so that the transmitting and receiving performance at a base station (BS) and the mobile stations (MSs) is optimized. This function is known as antenna selection (AS). Antenna selection is a method to improve system performance in terms of bit error rate (BER), signal to noise ratio (SNR) and throughput (TH).

Antenna selection has already been used by other MIMO-based wireless standards, such as IEEE 802.11n, 3GPP Long Term Evolution (LTE), R1-063089, "Low cost training for transmit antenna selection on the uplink," Mitsubishi Electric, NTT DoCoMo, 3GPP RAN1#47, R1-063090, "Performance comparison of training schemes for uplink transmit antenna selection," Mitsubishi Electric, NTT DoCoMo, 3GPP RAN1#47, R1-063091, "Effects of the switching duration on the performance of the within TTI switching scheme for transmit antenna selection in the uplink," Mitsubishi Electric, NTT DoCoMo, 3GPP RAN1#47, and R1-051398, "Transmit Antenna Selection Techniques for Uplink E-UTRA," Institute for Infocomm Research (I2R), Mitsubishi Electric, NTT DoCoMo, 3GPP RAN1#43, R1-070524, "Comparison of closed-loop antenna selection with open-loop transmit diversity (antenna switching between TTIs)," Mitsubishi Electric, 3GPP RAN1#47bis, all incorporated herein by reference.

Antenna selection has also been used in networks designed according to the IEEE 802.16 standard, wherein multiple antenna elements and radio frequency (RF) chains are supported in the BS and the MSs. However, antenna selection is only used in networks designed according to the IEEE 802.16e as a precoding scheme at the BS. No antenna selection has been foreseen at the MS.

WiMAX Network

Figure 1:
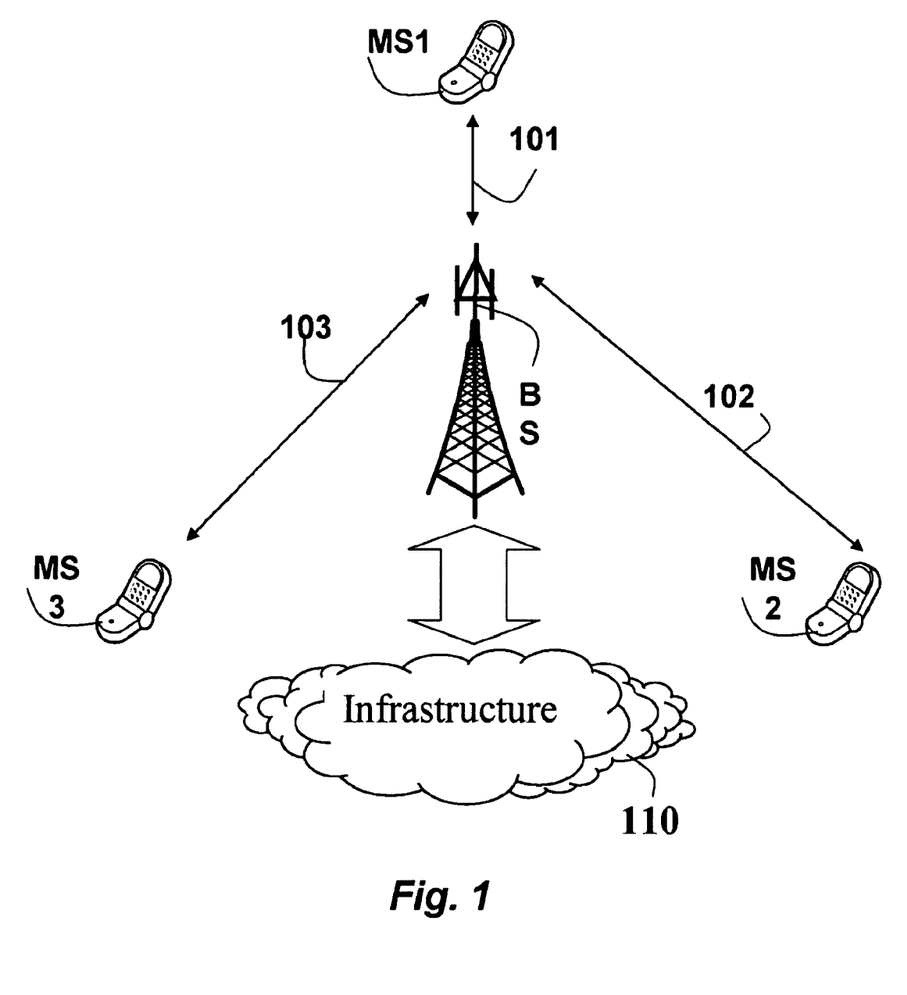
FIG. 1 is a schematic of an IEEE 802.16 WiMAX network used by embodiments of the invention.

FIG. 1 shows a conventional IEEE 802.16 WiMAX network. The network uses a point-to-multipoint communications between the BS and the MSs. The BS manages and coordinates all communications with the MS1-MS3 in a particular cell on connections 101-103, respectively. Each MS is in direct communication with one BS, and the BS communicates with an infrastructure 110 or "backbone" of the network. All communications to and from the MS must pass through the BS.

In order to carry out basic wireless communication, both the BS and the MS are equipped with at least one RF chain. Normally, the number of antenna elements N and RF chains M is equal at a BS, i.e., N=M. However, given the limitation of cost, size and energy consumption, it is usually true that an MS has more antennas than RF chains. Therefore, antenna selection is used at the MS.

The conventional IEEE 802.16 standard supports both time division duplex (TDD) and frequency division duplex (FDD) modes. The antenna selection describes herein applies to both modes.

Frame Structure

Figure 2:
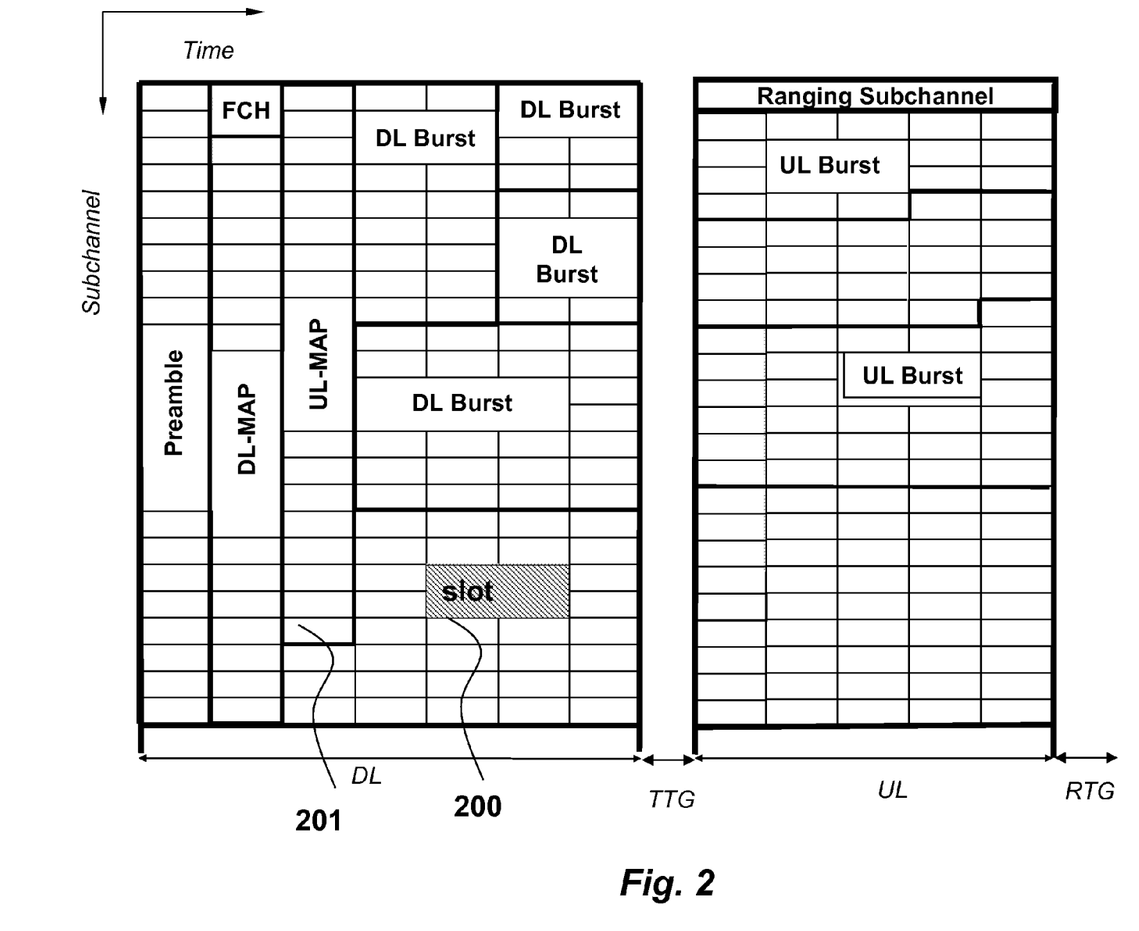
FIG. 2 is a schematic of an IEEE 802.16 frame structure under TDD mode used by embodiments of the invention.

As shown in FIG. 2, the TDD mode uses a frame structure on the uplink from the MS to the BS and the downlink from the BS to the MS. The preamble, FCH, bursts, maps, and gaps TTG and RTG are completely defined in the standard. In FIG. 2, the horizontal axis indicates time, and the vertical axes subchannels. A first subframe is for downlink (DL) transmission, and the second subframe is for the uplink (UL). In both the downlink and the uplink subframes of IEEE 802.16, OFDMA is used for multi-user channel access. OFDMA separates sets of orthogonal subcarriers (sub-channels) in the frequency domain and symbols in the time domain so that multiple MS can share all bandwidth resources, such as symbols and frequency subcarriers. Thus, in contrast with OFDM where only a single transceiver can be accommodated at any one time, OFDMA allows multiple MSs to communicate concurrently in OFDMA system.

In FIG. 1, each connection, such as 101, 102 and 103, between the BS and the MS is allocated a time-frequency resource, which contains a two dimensional block, i.e., time duration and frequency subcarriers. With OFDMA technology, the BS can communicate with all MSs on connection 101, 102, 103 by using two-dimensional bandwidth resource.

In the IEEE 802.16 standard, a minimal resource unit to be allocated is a slot 200. A size of the slot 200 is based on the permutation modes that the MS and the BS use for transmissions in uplink and downlink. A permutation mode defines the type of resource allocation in time and frequency domains. Different modes are defined for the UL and the DL. By using a specific permutation, a given number of OFDMA symbols and subcarriers are included in each slot.

Figure 3:
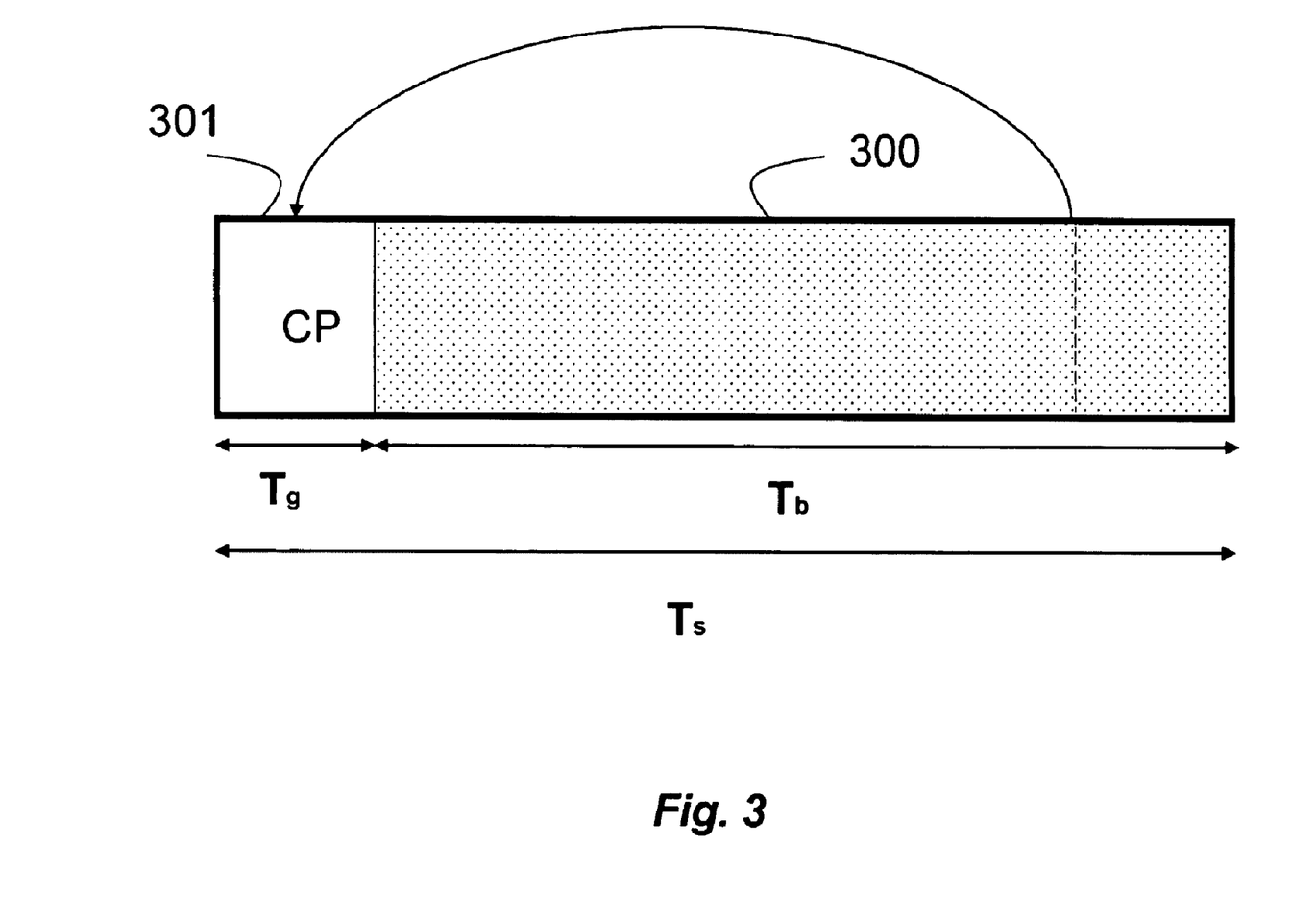
FIG. 3 is a schematic of an OFDMA symbol used by embodiments of the invention.

FIG. 3 shows a structure of an OFDMA symbol 300, where $T_s$ is the symbol duration, $T_b$ is the information (data) duration and $T_g$ is the cyclic prefix CP 301 The CP 301 is derived from the data at the end of $T_b$, which are copied to the beginning of the symbol. $T_g$ is a configurable time period and is approximately a few microseconds long. The frequency subcarriers are generated by a fast Fourier transform (FFT) to construct the complete frequency spectrum. Frequency subcarriers are classified into groups according to different uses, such as DC, data, pilot and guard subcarriers.

The current IEEE 802.16e standard, which uses OFDMA for both downlink and uplink multiple access, does not support antenna selection at mobile stations.

U.S. patent application Ser. No. 11/777,356, "Method and System for Selecting Antennas Adaptively in OFDMS Network," file by Tao et al., (hereinafter Tao) on Jul. 13, 200, incorporated herein by reference, describes a method and system for antenna selection at the IEEE 802.16 mobile station that has fewer RF chains than antennas.

However, depending on the hardware capability, the training process described there is insufficient to yield an accurate channel estimate while switching antennas. Moreover, there are certain scenarios in that protocol and signaling design that can not result in optimal solution. The signaling and training method according to embodiments of this invention address these issues.

SUMMARY OF THE INVENTION

A method selects antennas in an OFDMA wireless network including a base station and a mobile station.

The mobile station measures a channel state of a downlink in a downlink subframe using different subsets of available antennas, and selects a subset of receive antennas for downlink reception based on the channel states between the base station and the different subsets of antennas at the mobile station.

The base station measures the channel state in an uplink using an uplink subframe received in the base station from the mobile station, and selects a subset of transmit antennas for mobile station's uplink transmission based on the channel states between the base station and different subset of antennas at the mobile station.

DETAILED DESCRIPTION OF THE PREFERRED EMBODIMENTS

The following terms are defined and used herein.

Slot: A slot is the minimum resource unit allocated to an MS in UL and DL. A slot is two dimensional and is measured in time duration and frequency subcarriers.

Antenna Selection (AS): AS is used during transmitting and receiving at the MS or the BS to optimize the system performance. AS can be classified into Transmit Antenna Selection (TAS) and Receive Antenna Selection (RAS), which are intended to select antenna for transmitting and receiving, respectively.

Pilot Subcarrier/tone: In IEEE 802.16, the subcarriers are divided into several groups, including data subcarriers, pilot subcarriers, DC subcarriers, and guard subcarriers. The receiver uses received signal on pilot subcarriers to estimate the channel. The allocation of pilot in the entire set of subcarriers depends on the permutation mode.

Signaling for Downlink Mobile Station Receive Antenna Selection

The embodiments of our invention provide a method and system for selecting antennas in an orthogonal frequency division multiple access (OFDMA) wireless network including a base station and a mobile station. The mobile station has a set of antennas, and perhaps fewer RF chains. Therefore, a subset of antennas needs to be selected, wherein the subset can be one or more of the antennas in the set.

To enable the antenna selection for signals received on a downlink at the mobile station (MS) from the base station (BS), no extra signaling is required. The MS can autonomously select the subset of antennas to use. In a reciprocal channel, the uplink does not absolutely require control signaling, because the MS can use the same subset of antennas for transmitting and receiving. By reciprocity, we mean that the channel states and qualities are substantially the same on the downlink and the uplink. Non-reciprocity means that the channel states and qualities for downlink and uplink are substantially different However, there are some benefits in signaling the selected subset of antenna to the BS. If the BS performs channel tracking, then the MS should indicate the selected subset of antennas to the BS, because changing antennas can cause an abrupt change in the channel state. Such channel tracking is useful for channel prediction, noise reduction, etc. If the BS is also capable of antenna selection, the BS has to make sure that the training signals it receives originate from the same subset of antennas at the MS.

Thus, MS should indicate that it has switched the antenna subset. The MS can indicate this in one bit information to the BS. This one bit can be in a generic MAC header, a subheader, an extended subheader or MAC header without payload.

Alternatively, the MS can send a separate management message to indicate the switch in subsets, or the index of the antenna subset to which it switched.

For example, if the mobile station has four antennas and two RF chains, the index (.) of each antenna can be (1) antenna 1, (2) antenna 2, (3) antenna 3, (4) antenna 4. MS can just feedback back the indices of the two antenna that have been selected. Alternatively, the MS can label the possible subsets with indices. For instance, for a mobile station with four antennas and two RF chains, its possible antenna subsets can be indexed (.) as (1) antenna 1 and 2, (2) antenna 1 and 3, (3) antenna 1 and 4, (4) antenna 2 and 3, (5) antenna 3 and 4, (6) antenna 3 and 4. The MS can feedback one index for the antenna subset being selected. Of course, additional communication between MS and BS would be needed for the latter example, as BS has to be informed of the identity and index of each antenna within each antenna subset.

The MS can feedback this antenna index or antenna subset index to BS in a subheader, extended subheader or MAC header without payload. Alternatively, MS can also send a separate management message to indicate the identities of the antennas in the selected subset.

Signaling for Uplink Mobile Station Transmit Antenna Selection

Tao described an OFDMA antenna selection control information element (IE) to support selection of the transmit antennas at the mobile station for the uplink.

The format of that IE is shown in Table 1 and briefly explained below for reference purpose.

TABLE 1

OFDMA Antenna Selection Control IE

| Syntax | Size (bit) | Notes |
|---|---|---|
| Antenna_Selection_Control_IE( ) { | — | — |
| Extended UIUC | 4 | Antenna selection control = 0x0B |
| Length | 4 | Length = 0x01 |
| UL_AS_Indication | 1 | Indicate whether mobile station shall perform uplink transmitter antenna selection in the current frame. |
| UL_AS_Selection | 7 | The value of this field indicates which antenna subset is selected by the MS for uplink transmission. |
| } | | |

The "extended UTUC" field in the ASC UL IE, which has a value "0x0B", indicates that this IE an extended UIUC IE. The "length" field indicates the length in byte of the subsequent "UL_AS_Control" and "UL_AS_Selection" field.

The "UL_AS_Control" field, when set to 1, indicates that the MS performs uplink transmitter antenna selection in the current frame. If this field is set to 0, then the MS uses the "UL_AS_Selection" field to indicate the selected subset. More specifically, the value of the "UL_AS_Selection" field indicates which antenna subset has been selected for future transmission. For example, if UL_AS_Control" field is "0x01", then this means that the antenna subset switched to immediately after using the original antenna subset is selected for subsequent uplink transmission.

Figure 4:
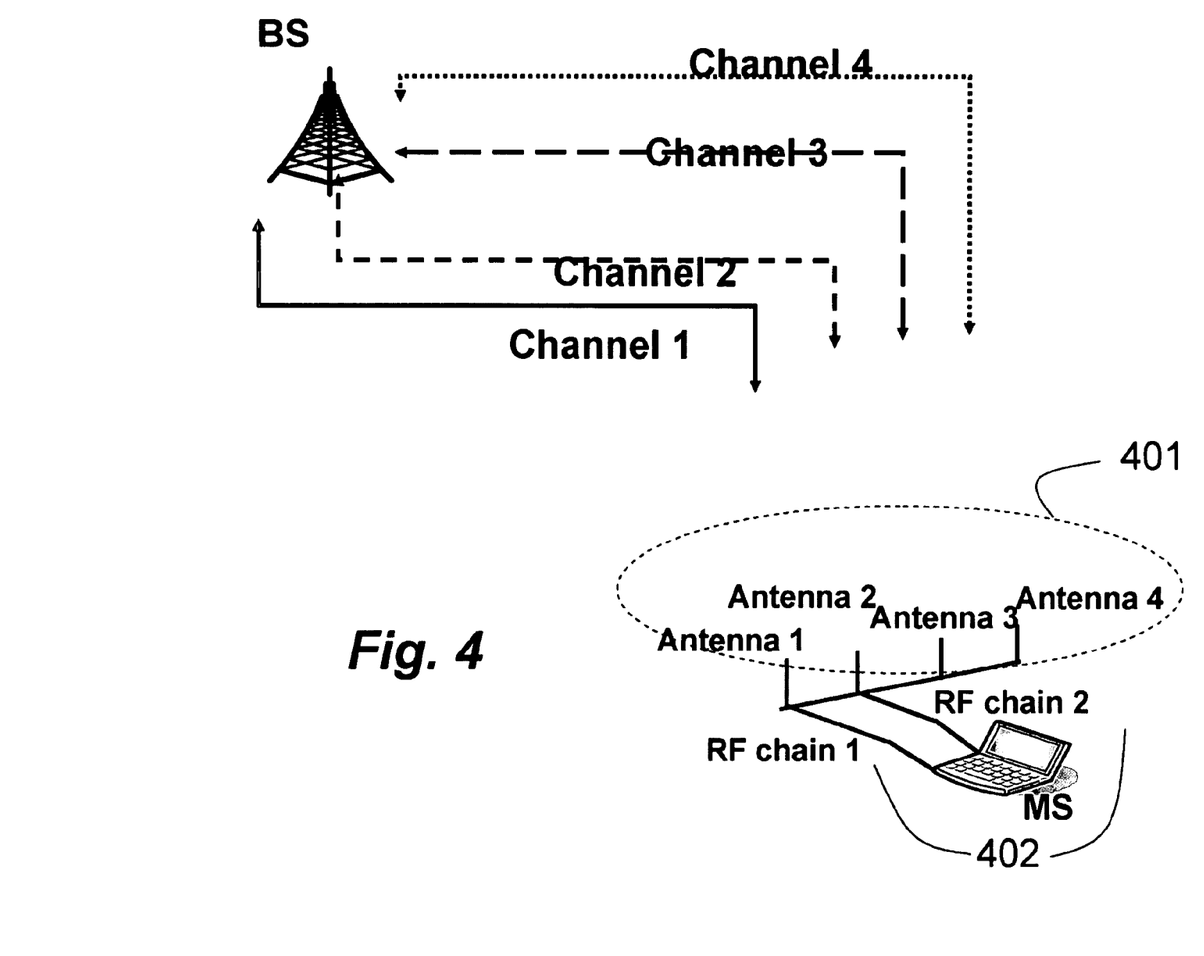
FIG. 4 is a schematic of using two RF chains and 4 antennas at MS to communicate with BS according to embodiments of the invention.
Figure 5:
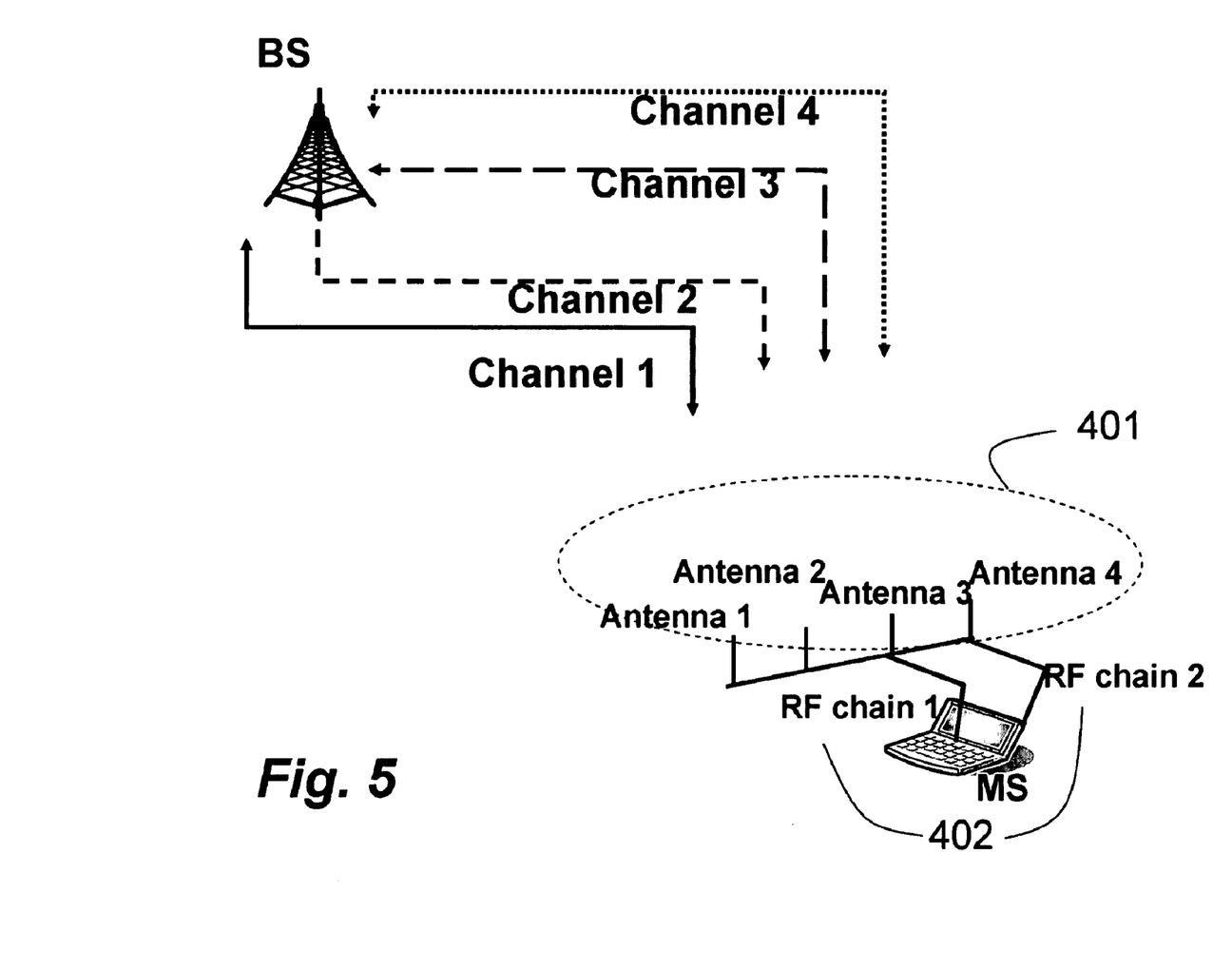
FIG. 5 is another schematic of using two RF chains and 4 antennas at MS to communicate with BS according to embodiments of the invention.

However, further design optimization is possible. For example, FIG. 4 and FIG. 5 show an example of training procedures for uplink transmit antenna selection for an MS with four antennas 401 and two RF chains 402. In FIG. 4, the MS connects its two RF chains to a subset including antenna 1 and 2 to transmit pilots in the uplink to BS. In FIG. 5, the MS connects its two RF chain to the subset including antenna 3 and 4 to transmit pilots in the uplink to BS.

In order to have an optimal antenna selection, the MS sends the pilot signal using all possible combinations of antenna subsets. That is, for example, the MS sends pilot using not only the antenna subset combination shown in FIGS. 4 and 5, but also the following possible antenna subset with indices as described above:

a. Antenna subset (2) including antenna 1 and 3
 b. Antenna subset (3) including antenna 1 and 4
 c. Antenna subset (4) including antenna 2 and 3
 d. Antenna subset (5) including antenna 2 and 4

Note that this antenna subset testing/training process can cause significant overhead.

However, it is technically feasible for the BS to obtain the channel information associated with each antenna of MS individually, and then select an optimal antenna subset, e.g., antennas 1 and 3, without needing MS to send pilot using all possible antenna subset combinations.

To enable this, the antenna selection control UL IE described by Tao is inadequate, and new signaling message is needed. The new signaling message indicates to the BS that the MS is to perform uplink antenna selection, and a. an index of the subsets of antennas selected, and
 b. an identity of specific antennas within each selected subset of antennas.

Signaling for Basic Capability Negotiation

Tao uses the extended "OFDMA SS Modulator for MIMO support" TLV and "OFDMA SS Demodulator for MIMO support" TLV in SBC-REQ and SBC-RSP message to negotiate the capability of supporting receive antenna selection for the downlink from the BS to the MS, and the capability of supporting transmit antenna selection for the uplink.

Given the change in the current IEEE 802.16 standard Rev D3 "DRAFT Standard for Local and metropolitan area networks, Part 16: Air Interface for Broadband Wireless Access Systems, P802.16Rev2/D3 (February 2008) (Revision of IEEE Std 802.16-2004 and consolidates material from IEEE Std 802.16e-2005, IEEE Std 802.16-2004/Cor1-2005, IEEE Std 802.16f-2005 and IEEE Std802.16g-2007)", we modify the design of "OFDMA SS Demodulator for MIMO support" TLV and "OFDMA SS Modulator for MIMO Support" TLV as follows.

TABLE 2

OFDMA SS Demodulator for MIMO Support

| Type | Length | Value | Scope |
|---|---|---|---|
| 176 | 3 | Bit 0: 2-antenna STC matrix A<br>Bit 1: 2-antenna STC matrix B, vertical coding<br>Bit 2: Four receive antennas<br>Bit 3: 4-antenna STC matrix A<br>Bit 4: 4-antenna STC matrix B, vertical coding<br>Bit 5: 4-antenna STC matrix B, horizontal coding<br>Bit 6: 4-antenna STC matrix C, vertical coding Bit 7: 4-antenna STC matrix C, horizontal coding<br>Bit 8: 3-antenna STC matrix A<br>Bit 9: 3-antenna STC matrix B<br>Bit 10: 3-antenna STC matrix C, vertical coding<br>Bit 11: 3-antenna STC matrix C, horizontal | SBC-REQ, SBC-RSP |

TABLE 2-continued

OFDMA SS Demodulator for MIMO Support

| Type | Length | Value | Scope |
|---|---|---|---|
| | | coding
Bit 12: Capable of calculating precoding weight
Bit 13: Capable of adaptive rate control
Bit 14: Capable of calculating channel matrix
Bit 15: Capable of antenna grouping
Bit 16: Capable of antenna selection
Bit 17: Capable of codebook based precoding
Bit 18: Capable of long-term precoding
Bit 19: Capable of MIMO Midamble
Bit 20: Allocation granularity in a DL PUSC STC zone with dedicated pilots
Bit 21: Concurrent allocation support in a DL PUSC STC zone with dedicated pilots
Bit 22 Capable of downlink receive antenna selection
Bits 23: Reserved | |

TABLE 3

OFDMA SS Modulator for MIMO Support

| Type | Length | Value | Scope |
|---|---|---|---|
| 177 | 2 | Bit 0: Two Tx antennas
Bit 1: Capable of Tx diversity
Bit 2: Capable of spatial multiplexing
Bit 3: Capable of beamforming
Bit 4: Capable of adaptive rate control
Bit 5: Capable of single antenna
Bit 6: Capable of two antennas
Bit #7: collaborative SM with two antennas
Bit #8: Capable of disabling UL subchannel rotation
Bit 9: Capable of uplink transmit antenna selection
Bit #10-15: Reserved | SBC-REQ, SBC-RSP |

A clarification of how to interpret these two extended TLVs is provided in the Table 4 below.

TABLE 4

Interpretation of extended "OFDMA SS Modulator for MIMO support" TLV and "OFDMA SS Demodulator for MIMO support" TLV

| TLV | Messages | |
|---|---|---|
| | SBC-REQ (sent from MS to BS) | SBC-RSP (sent from BS to MS) |
| Extended "OFDMA SS Modulator for MIMO support" | If "Bit 9: Capable of uplink transmit antenna selection" equals 0, MS indicates to BS that it does not support uplink transmit antenna selection.
If "Bit 9: Capable | If "Bit 9: Capable of uplink transmit antenna selection" equals 0 if the BS is an IEEE 802.16m BS, it means that BS indicates explicitly to MS that the BS does not support uplink transmit antenna selection.
if the BS is an IEEE 802.16 legacy BS, Bit 7 is a reserved bit and is always set to 0 by the BS. In either case, MS does not use uplink transmit antenna selection any longer, as BS does not support it.
If "Bit 9: Capable |

TABLE 4-continued

Interpretation of extended "OFDMA SS Modulator for MIMO support" TLV and "OFDMA SS Demodulator for MIMO support" TLV

| TLV | Messages | |
|---|---|---|
| | SBC-REQ (sent from MS to BS) | SBC-RSP (sent from BS to MS) |
| | of uplink transmit antenna selection" equals 1, MS indicates to MS that it supports uplink transmit antenna selection. | of uplink transmit antenna selection" equals 1, the BS indicates explicitly to the MS that the BS supports uplink transmit antenna selection. In this case, MS can use uplink transmit antenna selection. |
| Extended "OFDMA SS Demodulator for MIMO support" | If "Bit 20: Capable of downlink receive antenna" equals 0, MS indicates to BS that it does not support downlink receive antenna selection. | If "Bit 22: Capable of downlink receive antenna" equals 0 if the BS is an IEEE 802.16m BS, it means that BS indicates explicitly to MS that it does not support downlink receive antenna selection.
if the BS is an IEEE 802.16 legacy BS, Bit 7 is a reserved bit and is always set to 0 by the BS. In either case, it will be up to the MS whether it will use downlink receive antenna selection or not. If downlink receive antenna selection is transparent to BS, MS can use downlink receive antenna selection.
If downlink receive antenna selection is not transparent to BS, MS should not use downlink receive antenna selection. For example, as described before, if MS needs to feedback the index of selected antenna, or feedback simply the fact that antenna selection has occurred to the BS (e.g., for channel tracking purpose), downlink receive antenna selection becomes non-transparent to BS. Then, for a 16m BS that does not support downlink receive antenna selection or for a legacy 802.16 BS, MS should not use downlink receive antenna selection.
Of course additional method would be needed for MS to learn whether downlink receive antenna selection is transparent or not to the BS. For example, use bit #23 in this TLV can be used by BS to further indicate whether downlink receive antenna selection will be transparent to it or not. If bit #23 = 0, it means that the downlink receive antenna selection is transparent to BS. If bit #23 = 1, it means that the downlink receive antenna selection is not transparent to BS. Because MS does not whether downlink receive antenna selection will be transparent to BS, bit #23 can still be reserved in the "OFDMA SS Demodulator for MIMO support" TLV sent in the SBC-REQ. |
| | If "Bit 20: Capable of | If "Bit 20: Capable of |

TABLE 4-continued

Interpretation of extended "OFDMA SS Modulator for MIMO support" TLV and "OFDMA SS Demodulator for MIMO support" TLV

| | Messages | |
|---|---|---|
| TLV | SBC-REQ (sent from MS to BS) | SBC-RSP (sent from BS to MS) |
| | downlink receive antenna" equals 1, MS indicates to BS that it supports downlink receive antenna selection. | downlink receive antenna" equals 1, the BS indicates explicitly to the MS that it supports downlink receive antenna selection. In this case, MS can use downlink receive antenna selection. |

As an alternative signaling design, if downlink receive antenna selection is completely transparent to the BS, we can reuse the format of "OFDMA SS Demodulator for MIMO Support" TLV defined in the current 802.16 standard and keep bit #22 and 23 reserved for other usage. In this case, the MS can decide whether to use downlink antenna selection entirely by itself.

Training for Antenna Selection

In the training process as described by Tao, the MS uses different antenna subsets for different symbols that contain pilot tones so that the channel between the BS and that particular antenna subset being used can be estimated. Final antenna selection decision is made based on the quality estimate of the channel between the BS and multiple antenna subsets.

However, that training process can be infeasible, due to the implementation constraint. For example, an implementation can be done in such a way that a slot is used as a resource unit for transmission and/or reception. In addition, the pilot contained in a single OFDMA symbol does not allow one to obtain a sufficiently accurate channel estimate. To address those problems, the MS can use a different antenna subset at a different resource block for channel estimate.

Figure 6:
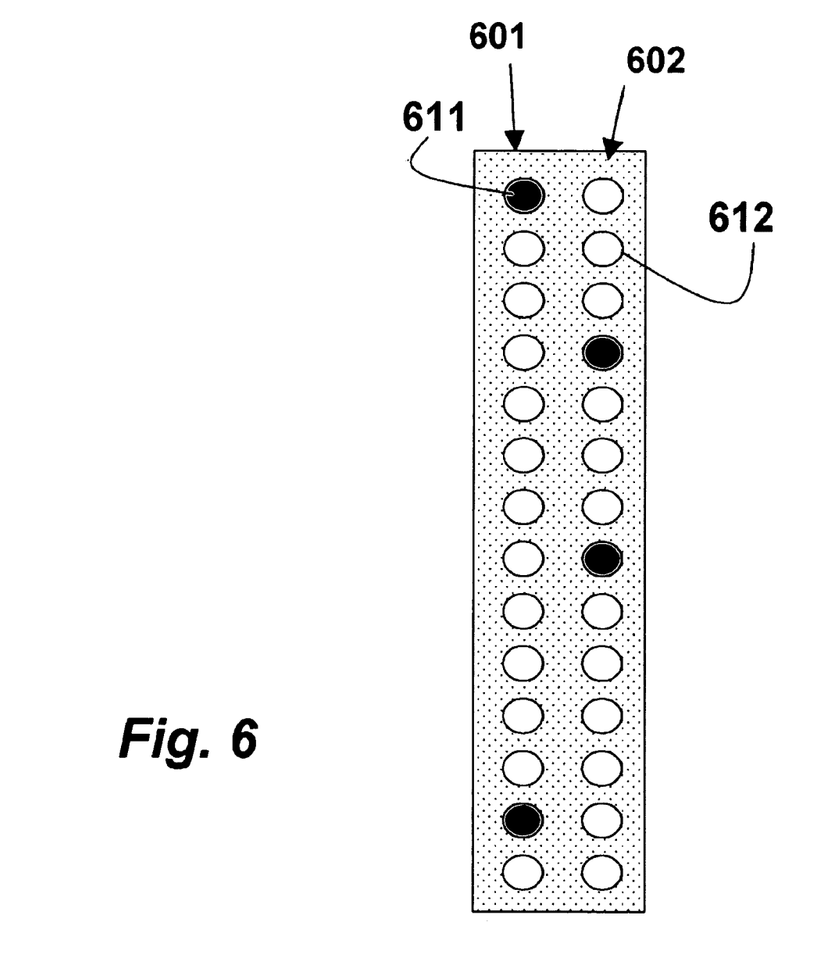
FIG. 6 is a schematic of a DL PUSC slot according to embodiments of the invention.

The resource block can be an OFDMA slot defined in the IEEE 802.16 standard. For example, FIG. 6 shows the slot structure of a slot in the DL partial used subcarrier (PUSC) mode. In this mode, each slot includes two contiguous sets of OFDMA symbols in time and one sub-channel in frequency. Each sub-channel includes 14 subcarriers, when FFT size is 1024. The OFDMA symbols can be called odd 601 and even 602 symbols. The location of pilot symbols 611 and data 612 is different in the odd and even OFDMA symbols.

Figure 7:
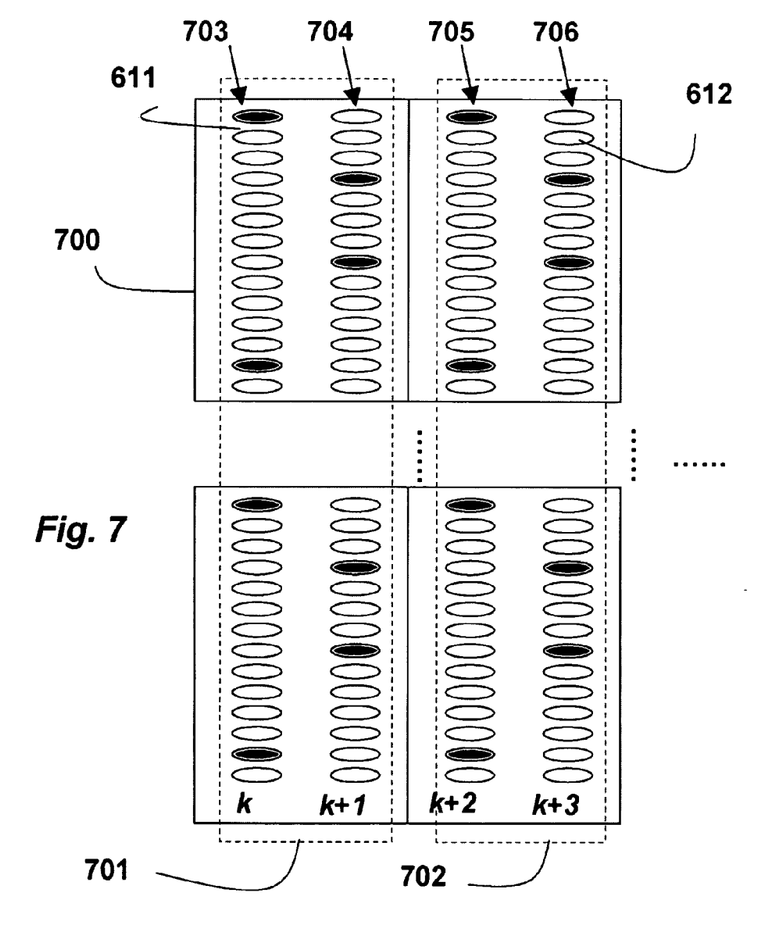
FIG. 7 is a schematic of antenna switching for DL PUSC zone according to embodiments of the invention.

FIG. 7 shows an example where the MS uses antenna set j 701 is used to receive symbol k 703 and symbol k+1 704. Then, the MS switches to antenna set j+1 702, for example during the cyclic prefix of symbol k+2, to receive symbol k+2 705 and k+3 706. This process can be continued for symbols k+4, k+5, etc., until all additional antenna sets have been tested. Note that depending on the selection process used by the receiver, only a few antenna subsets need to be tested. Based on the channel state information of the antenna sets received with thus far, the MS can determine the antenna set to use to optimize performance.

If a single OFDMA slot does not contain enough pilot tones for channel estimation, then the resource block includes multiple OFDMA slots. Note that an OFDMA slot can contain different number of OFDMA symbols and subcarriers for different subsets of the antennas.

Figure 8:
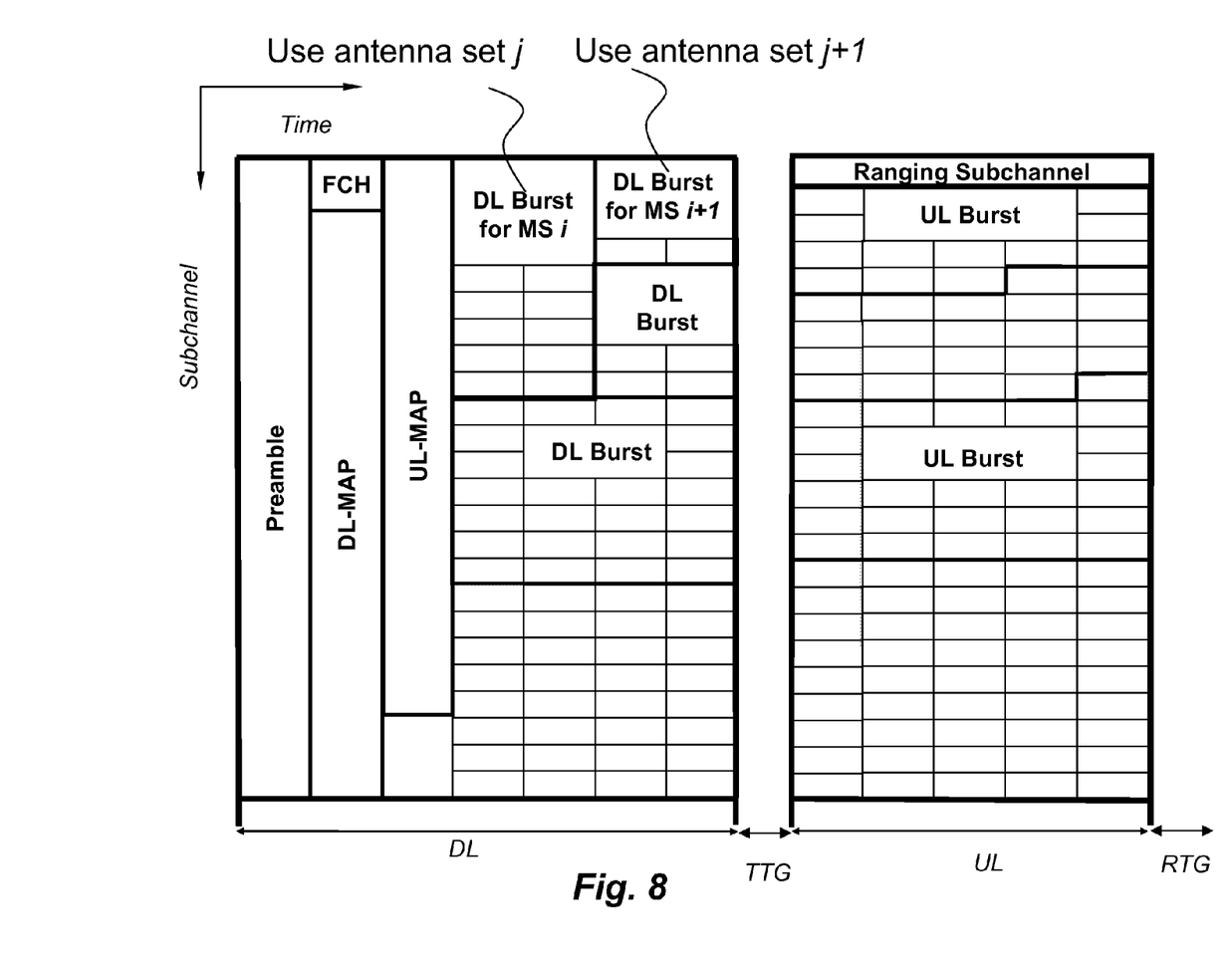
FIG. 8 is a schematic of antenna switching in a downlink subframe according to embodiments of the invention.

The resource block can also be the entire OFDMA resource allocated to the MS in the corresponding downlink subframe for reception. As shown in FIG. 8, for example, the MS i can use one antenna subset j for reception in the OFDMA resource that the BS allocates to the MS, and use another candidate antenna subset j+1 for reception in the OFDMA resource that the BS assigns to another MS i+1.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for selecting antennas in an OFDMA wireless network including a base station and a mobile station having a available antennas, comprising:
   measuring, by the mobile station, channel states of a downlink channel using a downlink subframe received in the mobile station from the base station using different subsets of the available antennas, in which each subset has an associated index, and each antenna has an associated identity;
   selecting, by the mobile station, a subset of receive antennas for downlink reception based on the channel states between the base station and the different subsets of antennas at the mobile station;
   measuring, by the base station, a channel state of an uplink channel using an uplink subframe received in the base station from the mobile station; and
   selecting, by the base station, a subset of transmit antennas at the mobile station for uplink transmission based on the channel states between the base station and different subset of antennas at the mobile station.

2. The method of claim 1, further comprising:
   indicating to the base station that the mobile station has selected the subset of receive antennas, and switched to one of the different subsets of antennas using one bit.

3. The method of claim 2, further comprising:
   indicating to the base station the associated index of the selected subset of the receive antenna and the identity of the antennas in the selected subset of the receive antennas.

4. The method of claim 1, further comprising:
   indicating explicitly, from the BS to the MS, whether antenna selection is supported or not for the downlink channel.

5. The method of claim 1, further comprising:
   indicating explicitly, from the BS to the MS, whether antenna selection is supported or not for the uplink channel.

6. The method of claim 1, further comprising:
   indicating explicitly, from the MS to the BS, whether antenna selection is supported or not for the downlink channel.

7. The method of claim 1, further comprising:
   indicating explicitly, from the MS to the BS, whether antenna selection is supported or not for the uplink channel.

8. The method of claim 1, in which the MS selects the subset of receive antennas transparently to the BS, if the BS does not support downlink antenna selection and the selecting of the subset of receive antennas is transparent to the base station.

9. The method of claim 1, further comprising:
indicating the associated index of the selected subset of transmit antennas and the identity of the antennas in the selected subset of the transmit antennas to the mobile station.

10. The method of claim 1, in which the measuring of the channel state of the downlink channel is performed on a resource block including one or multiple OFDMA slots, and one such OFDMA slot includes one or more contiguous sets of OFDMA symbols in time and one or more sub-channels in frequency depending on the permutation.

11. The method of claim 10, in which the resource block includes one OFDMA slot, and the measuring uses different OFDMA symbol for different subsets of antennas.

12. The method of claim 10, in which the resource block includes multiple OFDMA slots, and the measuring uses different multiple OFDMA slots for different subsets of antennas.

13. The method of claim 10, in which the resource block is an entire OFDMA resource allocated to the MS in a corresponding downlink subframe for reception in the OFDMA resource, and the MS uses one subset of antennas for reception in the OFDMA resource that the BS allocates to the MS, and use another subset of antennas for reception in the OFDMA resource that the BS assigns to another MS.

* * * * *